Dec. 22, 1936.    R. A. DOERING    2,065,061
DOUBLE ACTING CONDIMENT SHAKER
Filed May 18, 1936    2 Sheets-Sheet 1
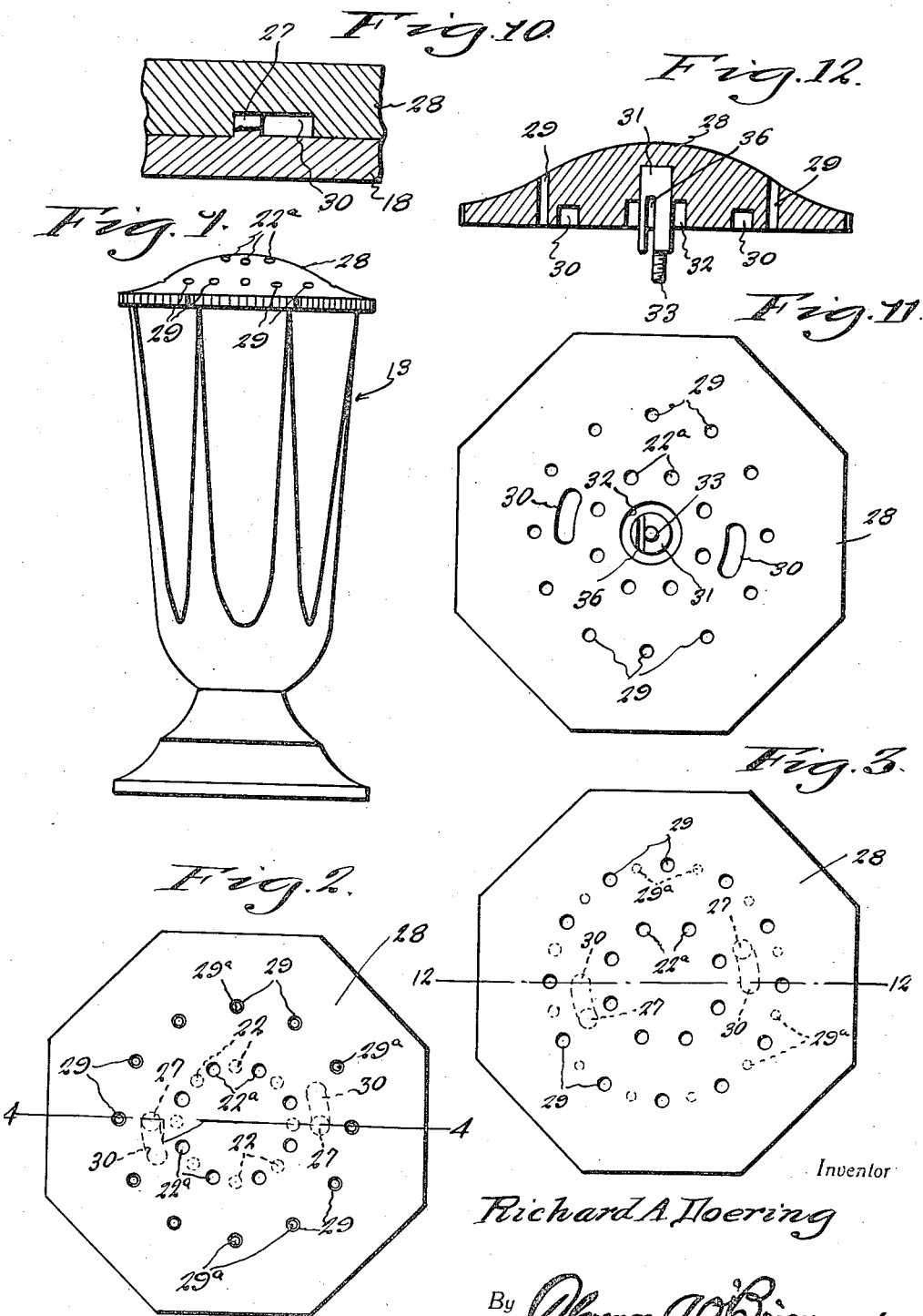
Inventor
Richard A. Doering
By Clarence A. O'Brien and
Hyman Berman
Attorneys

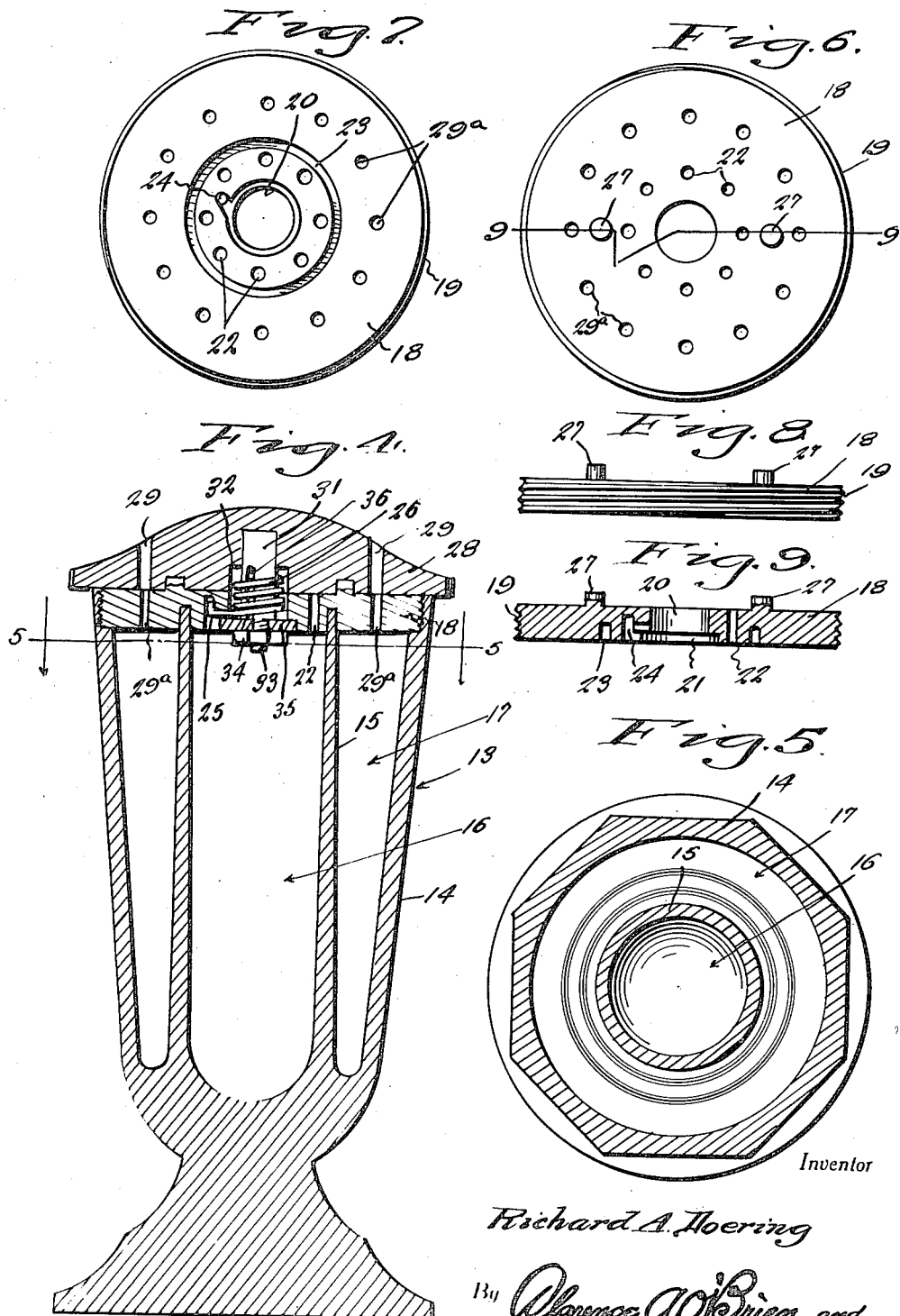

Patented Dec. 22, 1936

2,065,061

UNITED STATES PATENT OFFICE 2,065,061

DOUBLE ACTING CONDIMENT SHAKER

Richard A. Doering, York, Pa.

Application May 18, 1936, Serial No. 80,453

2 Claims. (Cl. 65—45)

This invention relates to an improved two-way or double acting condiment shaker, and has reference to a single table article adapted to simultaneously hold a charge of salt and a separate charge of pepper, and to permit these products to be selectively and successively discharged when the shaker is in the usual inverted position.

Needless to say, I am aware that it is not broadly new to construct so-called combination salt and pepper shakers. It is my aim and ambition, however, to promote progress in this particular line of endeavor by providing a structurally distinct combination shaker whose features are aptly fitted for the particular purposes intended.

As will be hereinafter discerned, the appreciable structural differences and refinements have to do with a special adaptation of properly selected and mechanically coordinated parts characterized essentially by an oscillatory, finger-controled, two-way valve which is normally open for gravity discharge of salt, and which may thereafter be rapidly adjusted, while in the inverted position, to cut off the salt discharge and to free the pepper.

Stated along more specific structural lines, novelty is thought to reside in a one-piece shaker unit characterized by a central pepper receptacle arranged in concentric noncommunicating relation with respect to the surrounding outer salt receptacle, revolving and closing means being associated therewith in such a manner as to definitely regulate the discharge of the desired condiment.

The outstanding improvement of the structure, however, relates in particular to the valved closure embodying an oscillatory apertured valving disc which is spring-returned and susceptible of easy control by a slight twist while the shaker is inverted to regulate the desired alternate or progressive salt and pepper discharge operations.

Other features and advantages will become more readily apparent from the following description and drawings.

In the drawings, wherein like numerals are employed to designate corresponding complemental parts throughout the views:

Figure 1 is a side elevational view of the two-way or double acting salt and pepper shaker constructed in accordance with the principles of the present invention;

Figure 2 is a top plan view on a slightly enlarged scale, of Figure 1, showing how the registering salt discharging holes are normally in alignment to expedite immediate discharge of salt when the shaker is inverted or turned upside down;

Figure 3 is a contrast view like Figure 2 showing the position of the cap valve after it is turned around to the predetermined step to cut off the salt and allow the pepper holes to register;

Figure 4 is an enlarged sectional view taken approximately on the plane of line 4—4 of Figure 2;

Figure 5 is a horizontal section on the line 5—5 of Figure 4;

Figure 6 is a top plan view of the disc-like closing plate or plug for the salt and pepper receptacles or chambers, the valve being removed;

Figure 7 is a bottom plan view of Figure 6;

Figure 8 is an edge view of the same part shown in Figures 6 and 7;

Figure 9 is a section on the irregular line 9—9 of Figure 6;

Figure 10 is a fragmentary detail view showing the superimposed association of the respective sections or parts of the complete closure unit;

Figure 11 is a bottom plan view of the octagonal oscillatory valving disc;

Figure 12 is a section which may be said to be approximately on the plane of the line 12—12 of Figure 3 showing only said valving disc.

Calling attention first to Figure 1, it will be observed that the receptacle or container portion of the double acting shaker is denoted by the numeral 13. It is of appropriate material and configuration. As shown to advantage in Figure 4, it comprises an upstanding outer shell or wall 14 whose upper end is internally screw-threaded to form an annular ledge. Arranged concentrically within the main shell is a vertical cylinder 15 whose upper end terminates on a plane below the corresponding end of the wall or shell 14. These features cooperate in defining an inner receptacle or holder 16 for pepper and an outer surrounding salt receptacle 17.

Attention now comes to the closing disc forming the relatively fixed unit or section of the two-part valving and closing means. This is in the nature of a light weight aluminum or metal disc, preferably non-corrosive, which is indicated by the numeral 18. It is of a diameter to fit in the upper end portion of the receptacle 14 and is of a thickness to terminate flush when it rests on the ledge formed in said part 14 as shown to advantage in Figure 4. It is screw-threaded around its marginal portion indicated at 19 so that it threads into the shaker and seats on the ledge. It is provided with a central adapter hole 20 and a counter bore or recess 21. It is further provided concentrically around the central opening 20 with a series of pepper discharge orifices or ports 22. At the point 23 is an annular groove. At the eccentric point 24 is a socket to accommodate the terminal end or detent 25 of the coiled spring 26. The numerals 27 designate upstanding studs which are in effect stop elements.

The relatively movable regulating valve unit or section is denoted by the numeral 28 and preferably has a knurled marginal portion forming an octagonal finger-turning rim. A series of inner concentric holes 22a are adapted to register with the pepper holes 22 in the stationary disc 18. A series of outer concentric holes 29 are adapted to normally register with companion salt holes 29a in registry with the salt receptacle 17 as shown in Figure 4. The numerals 30 designate segmental slots or grooves which receive the stop pins or studs 27 as also shown in Figure 4 as well as in Figure 10. The numeral 31 designates a centralized depending assembling bolt or pin which is formed rigid with the valving disc 28. This extends down through the socket 32 and then down through the adapter hole 20 where its lower end is screw-threaded as indicated at 33 to accommodate a clamping nut 34 for the washer 35. This bolt or pin is bifurcated or slotted as indicated at the point 36 to accommodate the inner end of the coiled spring. This spring 26 completely surrounds the pin and is located in the socket 32 and adapter hole 20. This arrangement provides the desired pivotal, spring-returned operating connection between the parts 18 and 28. It also provides a powder-tight connection in that the washer 35 closes the opening 20 by seating in the counter recess 21. The washer is of a diameter greater than the opening 20 and registering socket 32. At the same time the parts 18 and 28 can be separated for cleaning whenever necessary or desired.

Normally, when the parts are assembled as shown in Figure 4, the salt openings 29 and 29a are in registration with the salt containing pocket or receptacle 17. Thus, by merely inverting the shaker, the salt can be discharged in an evident manner. When it is desired to cut off the salt supply, all that is necessary is to place the thumb against one of the flat edged portions of the turnable valving disc 28 and to turn this in a clockwise direction. This is done against the tension of the spring and the stud 27 working in the pockets or grooves 30 limits the turning movement. By turning the valving disc 28 around until the stud 27 stops the rotary movement, it is evident that this closes the holes 29 and 29a and opens the complemental holes 22 and 22a whereby to permit pepper to be discharged from the inner receptacle 16.

Structurally speaking, it will be noted that the main stationary closing disc 18 is threaded into the upper end of the salt shaker and that the upper end of the cylinder 15 projects into the groove 23 to provide the desired non-communicating relationship between the compartments 16 and 17. The groove also acts as a guide to insure proper location of the discharge ports 22 and 29a, respectively. As before stated, the spring means automatically serves to retain the valving disc 28 in a set position under which conditions the openings 29 and 29a permanently register. Consequently, by simply inverting the shaker, the salt is immediately discharged. Then by a slight twist of the wrist, so to speak, the salt is cut off and the pepper is allowed to discharge. This may be accomplished in a one-handed operation which, to my mind, renders the structure more aptly fitted for the purposes intended as compared to inconvenient and complicated prior art devices.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In a closure structure of the class described, a closing disc provided with a central adapter hole, a concentric groove in its under side, and an inner and outer series of concentric rows of salt and pepper discharge ports, a valving disc superimposed on said first-named disc, the closing disc being provided with studs and the valving disc with grooves receiving said studs to limit the turning of the valving disc in relation to the closing disc, an assembling pin carried by the valving disc and extending through the adapter hole in the closing disc, nut and washer retaining means to maintain the discs in assembled relationship, and spring means cooperable with the assembling pin and said closing disc to normally maintain said discs in a predetermined relationship, said valving disc being provided with ports selectively registrable with the first-named ports.

2. In a structural assemblage of the class described, a salt containing receptacle having a concentric central cylinder forming a pepper receptacle, said salt receptacle having its upper end formed with an annular ledge and associated screw threads, a closing disk seated on said ledge and having marginal screw threads releasably engaged with said first named screw threads, said closing disk having a plurality of distinguishable rows of apertures registering respectively with the salt and pepper receptacles, said disk being further provided centrally in its under side with an annular groove receiving the upper end of said cylinder, and being additionally provided with an opening, a manually oscillated spring retained valve disk superimposed on and operatively connected with said closing disk, an assembling pin carried by said valving disk and extending through said opening and provided with a closure washer for said opening.

RICHARD A. DOERING.